Sept. 17, 1963    H. F. BISHOP ETAL    3,103,719
EXOTHERMIC WELDING APPARATUS
Filed March 29, 1961    2 Sheets-Sheet 1

INVENTORS
HAROLD F. BISHOP
DONALD E. WILEY
MICHAEL BOCK II
BY
Pennie, Edmonds, Morton, Barrows & Taylor
ATTORNEYS Sept. 17, 1963        H. F. BISHOP ETAL        3,103,719
EXOTHERMIC WELDING APPARATUS Filed March 29, 1961        2 Sheets-Sheet 2

INVENTORS
HAROLD F. BISHOP
DONALD E. WILEY
BY  MICHAEL BOCK II

ATTORNEYS

United States Patent Office 3,103,719
Patented Sept. 17, 1963

3,103,719
EXOTHERMIC WELDING APPARATUS
Harold F. Bishop, Donald E. Wiley, and Michael Bock II, Conneaut, Ohio, assignors to Exomet Incorporated, Conneaut, Ohio, a corporation of Ohio
Filed Mar. 29, 1961, Ser. No. 99,222
5 Claims. (Cl. 22—58)

This invention relates to welding long and heavy structural members such as bars of various shapes and steel rails, especially steel members that require preheating before welding and annealing after welding, and has for its object the provision of an improved process for preheating, welding, and annealing the welded steel members. In accordance with the invention exothermic materials are ignited in a sequence of preheating and welding, followed by retarded cooling to anneal the weld.

The invention provides a molded refractory structure or device for applying to the members to be welded a formed body of exothermic material for preheating the members at spaced distances from the weld, and a receptacle for another exothermic material of high heat capacity to form the weld which is a metal-producing exothermic material (hereinafter for convenience called "metal-producing material" or "metal-producing exothermic material"). The molded structure is preferably formed of at least two parts, preferably of mating halves, formed of molded refractory material having attached molded bodies of an exothermic moldable refractory material (hereinafter for convenience called "preheating material" or "preheating exothermic material") which preheats the members to be welded while retaining a rigid structure. After the preheating material has completed its reaction, the metal-producing material for forming the weld is ignited in the receptacle and the resulting molten metal which forms from the reaction runs between the members to form the weld, and the rigid structure which resulted from the preheating forms a barrier which prevents a loss of the metal from the weld.

The molded refractory structure is preferably formed of a hard and rigid material, such as a baked sand and resin mixture as are used in the shell-mold practice. The parts of the mold, when connected together over the members to be welded form three cavities one at the area of the weld closed at least in part by the preheating material and the refractory mold, one below the weld for receiving excess metal, and a receptacle above the weld for the metal-producing material for the weld.

When the parts, for example, two halves, are joined together they form a small passageway connecting the receptacle and the weld area for the flow of the molten metal into the weld area. One advantageous feature of the invention is the provision of a metal closure for this passageway to permit an accumulation of molten metal in the receptacle. When a sufficient mass of metal has accumulated the heat melts the closure, preferably one or more metal discs of the same composition as the molten metal, and the hot accumulated metal flows rapidly into the weld area. The objects to be welded are held apart to provide a gap for receiving the welding metal.

Another feature of the invention is the provision of a metal receiving basin in the refractory members below the weld so that more metal can flow through the gap than is necessary for the weld and accumulate in the basin. This provides a washing action on the cut surface to clean the surface, provides a hotter metal, and elevates the surface temperature.

In carrying out a welding operation of the invention, the two half parts are connected together over the ends of the members to be welded together and this secures the parts of rigid preheating material on opposite sides of each member a spaced distance from the ends to be welded. The connected parts of the mold form and enclose the receptacle which is charged with the metal-producing material. The preheating material is ignited as with a torch and this reaction is relatively slow liberating only enough heat to preheat the members at a distance to each side of the gap but without melting the refractory structure of this material. The disc closure is then placed over the passageway and the metal-producing material is put into the receptacle. A suitable time after igniting the preheating material, say about 12 minutes, the metal producing material in the receptacle is ignited to form the metal of the weld at a high temperature. The provision of the metal closure in the bottom of the receptacle performs an important function in keeping the granular metal-producing material out of the gap. The closure discs are of such thickness that they permit an accumulation of molten metal in the receptacle which allows the slag and metal to separate. When the discs melt the accumulated clean metal flows rapidly into and through the gap into the basin below, the amount of metal being much more than sufficient to fill the gap and make a good weld.

The refractory mold and the reaction products and residues of the two exothermic materials constitute a heat reservoir which cools slowly and anneals the weld and relieves stress.

These and other novel features of the invention will be better understood with reference to the drawings in which FIG. 1 is a perspective of two rail-ends in position for welding and one of the mold halves;

Figure 1:
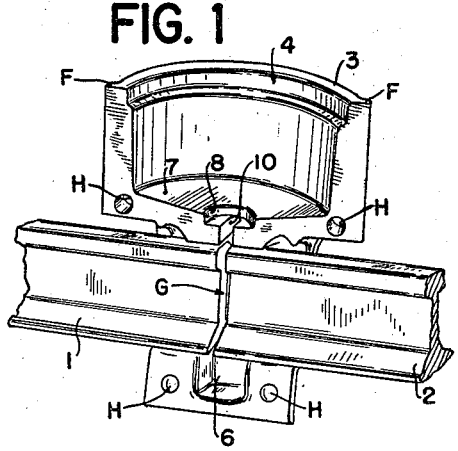

For convenience, the invention will be described with reference to the welding of rails, it being understood that the invention is applicable to the welding of other members such as girders, bars and rods. The rails 1 and 2 are spaced apart to form the gap G and, when necessary, are held rigidly together in clamps or a frame which has been omitted in the interest of clarity. The mold halves 3 are identical and only one will be described in detail. Each mold half is formed of any suitable rigid refractory and is preferably molded and baked. It is advantageous to form the mold by the shell-mold technique from a mixture of sand and a resin, preferably a thermosetting resin. The molds may be made of other ceramic material such as sand cores, carbon dioxide-hardened sodium silicate cores, and other types of molding usually used in foundry practice. The molds are, of course, shaped to fit closely to the particular object to be welded and consist of three parts in an integral structure, viz., a receptacle portion 4, a rail engaging portion 5, and an excess metal basin 6 at the bottom.

The two halves preferably have extending flanges F for the convenient and efficient connection by means of the spring clamps S which are easily pushed over the flanges as shown. One of the mold halves has partial cavities H for the insertion therein of centering projections (not shown) on the other half.

Figure 6:
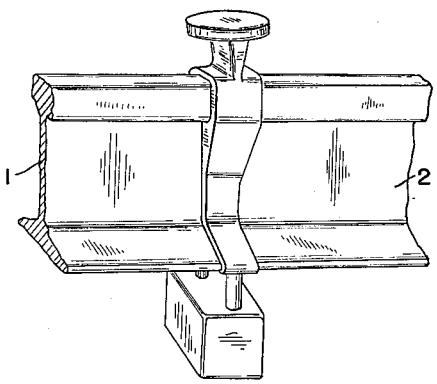
FIG. 6 shows rails welded according to the invention after removal of the mold.

The receptacle 4 is large enough to hold a mixture of metal-producing material to provide the metal as shown in FIG. 6 and has a tapering bottom 7 which leads to a semi-circular depression 8 in which a steel closure 9, preferably three discs from $\frac{1}{16}$ to $\frac{3}{8}$ inch thick, is placed to keep the granular exothermic material from falling through the rectangular slots 10 which form a pasageway into the gap G between the rails. This closure also delays the tapping to allow time for complete metal and slag separation.

The part 5 has an attached body of a special preheating exothermic moldable refractory material 11 (hereinafter described) which is rigid and non-fusible and shaped to conform to the shape of the rail. A flat extension 12 of this preheating material covers the top of the rail, and a part 13 in the form of a flat slab is placed beneath the rail and this part may be integral with parts 11 or in separate parts. In welding small rails the under part 13 may be omitted. The mold and the preheating material 11 may be formed together as an integral or composite structure. The part 13 has holes 14 and 15 for the flow of excess metal from the gap G into the receptacle 6. These holes should be carefully proportioned and should vary from about $\frac{1}{16}$ to $\frac{3}{8}$ inch depending on the rail or pieces being welded. When this exothermic material is ignited it reacts without melting and preheats the rail ends.

Figure 2:
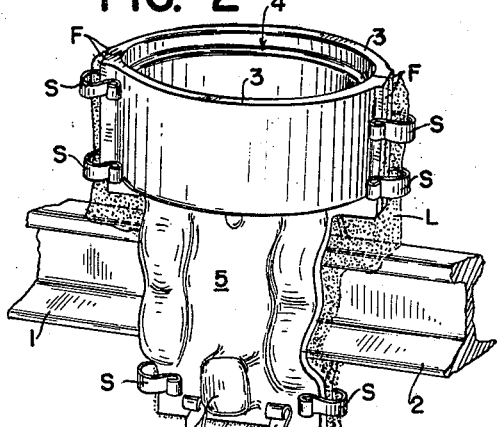
FIG. 2 is a view similar to FIG. 1 showing both mold halves in position.
Figure 3:
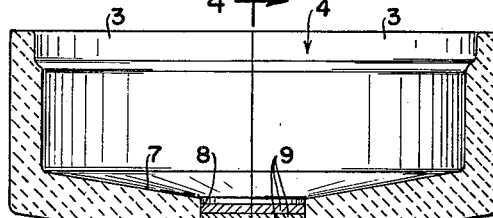
FIG. 3 is a sectional view at 3—3 of FIG. 4 with a rail in position for welding.
Figure 4:
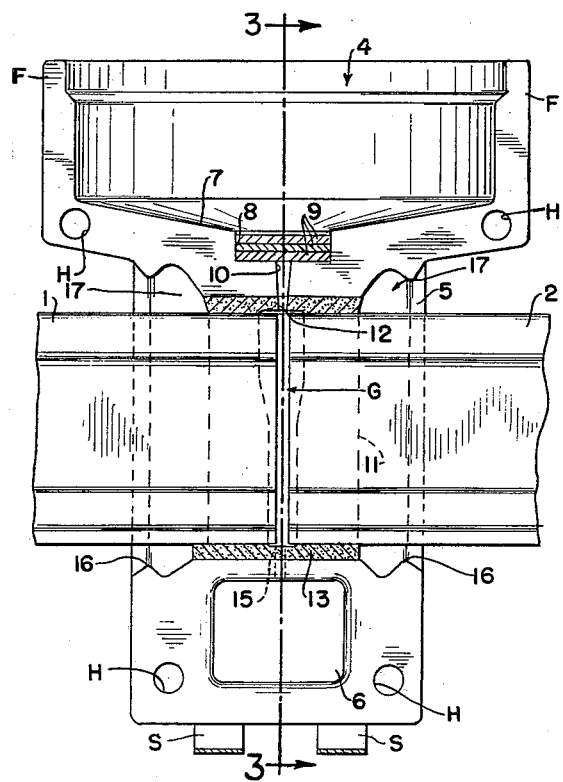
FIG. 4 is a sectional view of the mold at 4—4 of FIG. 3, with the rail in place.
Figure 5:
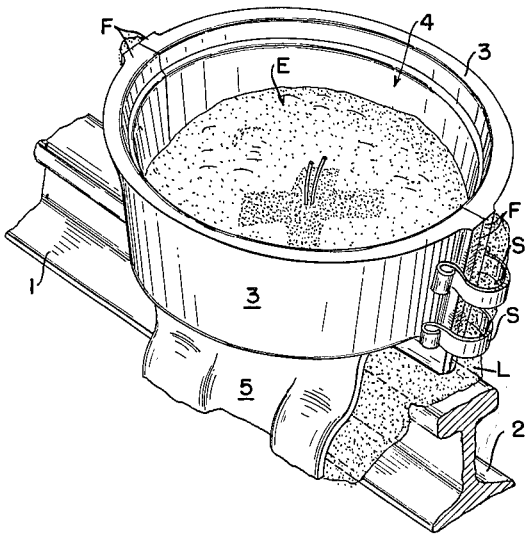
FIG. 5 is a perspective from above showing the connected mold halves when loaded with exothermic material.

As shown in FIGS. 3 and 4 the preheating material 11 is sloped under the rail head to provide the cavity I for weld metal. The mold has interior ribs 16 and spaces 17 which form pockets for packing with sealing sand L. Sealing sand is also used around the joints as shown in FIGS. 2 and 5 to keep the metal from running out.

The mold parts are preferably formed by the well known shell-mold practice of a mixture of sand and a thermosetting resin. This mixture is poured over a mold pattern which is heated to a temperature of about 500° F. The resin first softens and then sets or hardens to bind the particles of sand. This shell mold is then stripped from the pattern. Various thermosetting resins such as the phenol formaldehyde, preferably powdered and containing a cros-linking agent such as hexamethylene triamine or urea formaldehyde resins may be used. The mold parts of the invention are similarly made but preferably by also applying to the mold pattern a mixture of the preheating material which also contains such a resin to form a hard rigid structure. This preheating material is preferably molded to conform to the approximate shape of the rail so that there will be contact with the rail and a good transfer of heat to the rail. After shaping the bodies of this preheating material, the sand resin mixture for the mold is applied thereover and both are heated to set the resin and form a composite or integral structure. This preheating material contains refractory material to provide a non-fusible skeleton which maintains its shape to confine the space around the gap and hold the molten metal of the weld in place.

The following examples illustrate compositions for forming the exothermic moldable refractory material:

Example I

| | Percent |
|---|---|
| Al #123 | 10 |
| Al foil | 10 |
| Al #122 | 10 |
| Red iron oxide | 20 |
| Manganese dioxide | 5 |
| Barium nitrate | 5 |
| Potassium fluoborate | 1 |
| Geauga core sand | 29 |
| Monsanto RC 736 resin | 10 |

Example II

| | |
|---|---|
| Al foil | 9½ |
| Al grindings | 9½ |
| Al #123 | 9½ |
| Red iron oxide | 25 |
| Calamo | 34 |
| Barium nitrate | 6¼ |
| Potassium fluoborate | 1 |
| Monsanto RC 736 resin | 5 |
| Citric acid | ¼ |

Example III

| | |
|---|---|
| Al #123 | 13.6 |
| Al foil | 11.7 |
| KBF$_4$ | 1.5 |
| MnO$_2$ | 9.8 |
| Fe$_3$O$_4$ (−50 mesh) | 23.7 |
| BaNO$_3$ | 6.5 |
| Calamo 50 | 25.6 |
| Monsanto RC 736 | 7.6 |

Example IV

| | |
|---|---|
| Al #122 | 15.0 |
| Al foil | 3.5 |
| Red oxide | 21.0 |
| Manganese oxide | 6.0 |
| Sodium nitrate | 3.5 |
| Barium nitrate | 2.0 |
| KBF$_4$ | 2.0 |
| Al #123 | 10.0 |
| Sand | 27.0 |
| Monsanto RC 736 resin | 9.5 |

The metal producing material E for forming the weld which is placed in the receptacle 4 may have any suitable Thermit composition capable of producing the molten iron or steel for the weld, such as a pulverulent mixture of aluminum and iron oxide as the essential constituents together with varying amounts of slag forming material, and carbon or alloying metals when desired. For example, when welding steel rails which have a carbon content of 0.50% to 0.70% we prefer to use an alloy Thermit having a lower carbon content but about 1½% nickel so that a rail having, say, 0.60 carbon will have a weld having a 0.30% carbon and 1½% nickel. This will form a weld having a hardness matching that of the rail.

The following examples illustrate metal-producing exothermic material for forming the welds:

Example V

| | Percent |
|---|---|
| Steel punchings | 11.7 |
| FeMn (L.C.) | 1.5 |
| CaSi | .5 |
| Mill scale | 64.0 |
| Al #122 | 18.9 |
| NiO | 1.5 |
| Fluospar | 1.9 |

Example VI

| | |
|---|---|
| Cast iron shot | 5.8 |
| Steel punchings | 5.9 |
| FeMn (Std.) | 1.5 |
| CaSi | .5 |
| Ball-milled scale | 64.0 |
| Al #122 | 18.9 |
| Nickel oxide | 1.5 |
| Fluospar | 1.9 |

Example VII

| | |
|---|---|
| Cast iron shot | 5.8 |
| Steel punchings | 5.8 |
| FeMn | 1.5 |
| CaSi | .5 |
| Mill scale | 64.6 |
| Al #122 | 19.9 |
| Fluospar | 1.9 |

In carrying out a welding operation for the welding of steel rails the ends of the rails are cleaned to remove rust, scale, dirt, grease, etc., and the ends are preferably cut to provide a tapering gap between the ends for welding metal.

For rail sizes heavier than A.S.C.E. 90-pound rail, it is advantageous to V the rail from about ⅛ inch at the bottom to approximately 1 inch at the top. Actually, the V should be cut so that it forms a 4½° angle with the vertical center line of the gap. This would make a 9° included angle between the two cut rail ends. The purpose of the tapered opening is to insure complete fusion in the web area of the rail and to prevent centerline shrinkage in the weld metal.

In welding 132-pound A.R.E.A. rail, the gap should be 1 inch at the top and ⅛ inch at the bottom. For this particular size of rail about 9 pounds of preheating material 11 are used as shown in FIG. 3.

After the molds have been assembled around the rail with the clamps and sealing sand in place, the flame of a torch is directed through the opening 10 to ignite the preheating material 11. After about 15 minutes the rail ends will be preheated to a temperature of from 600° F. to 1600° F. The purpose of this preheating treatment is to prevent cracking in the weld and the heat-affected zone, and the degree of preheating required for this purpose is predicated upon the metallurgical composition, size, and configuration of the rail or other object to be welded. The degree of preheating produced is controlled by varying the weight of the preheating material 11.

After the prescribed waiting time, usually about 15 minutes, the metal discs 9 are inserted into the receptacle 8. The metal-producing material E is poured into the receptacle 4. Then ignition powder, consisting, for example, of a mixture of barium peroxide, 195 grams, and aluminum powder, 120 grams, is placed on the top of the metal-producing material E and a fuse, such as a perchlorate or dynamite fuse, is placed in the center of the ignition powder for the ignition of this powder. Then the fuse is ignited to ignite the ignition powder and start the exothermic reaction in the metal-producing material. This material reacts to form steel at a temperature of about 4600° F. When this material liberates an appreciable mass of molten steel the heat melts the discs 9 and the metal flows through opening 10 into the gap G between the rails. Since there is an appreciable excess of metal formed by the reaction, a considerable amount of it flows through holes 14 and 15 into the basin 6. After the reactions have subsided the mold is left in position for about one-half hour and is then removed. This insures that the weld area will be maintained at a temperature over 1000° for this period of time, which will serve to relieve residual stresses resulting from the high thermal gradients produced by the welding operation. This stress relieving treatment prevents the formation of hard spots and improves the mechanical properties of the weld metal. The resulting weld from the exothermic reaction may appear as in FIG. 6. The gate metal at the top and the underflow metal at the bottom are broken off and the remaining excess metal is ground off.

Figure 7:
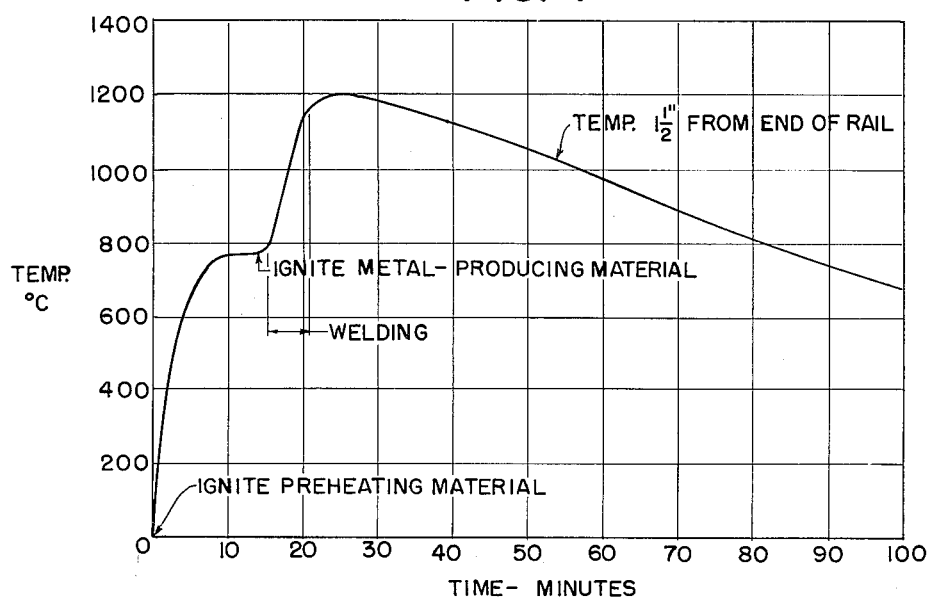
FIG. 7 is a curve showing the heating and cooling cycle in welding a ninety-pound steel rail.

The heating curve illustrated in FIG. 7 shows the rate and amount of preheating, the temperature increase resulting from igniting the metal-producing material and the rate and amount of cooling. The temperatures are those taken of the rail about 1¼" from the gap between the rails. The slow cooling made possible by the reservoir of heat effectively anneals the weld and removes the stress.

We claim:

1. A rigid refractory device for welding steel objects in the form of rods, rails, bars, and the like, which objects are held together in spaced relation to form a gap for the weld metal, said device being formed of at least two refractory mold parts which, when secured together, surround the objects at the area of the weld, said device consisting of a receptacle above the gap for holding a charge of metal-producing exothermic material, a rigid body of non-fusible preheating exothermic material on the inside of the refractory mold parts in contact with and spaced at each side of the gap, said rigid preheating exothermic material providing the heat for preheating the objects to be welded, an underflow basin within the refractory mold parts below the gap to receive excess metal, a passageway from the receptacle to the gap for the flow of metal from the metal-producing exothermic material into the gap, and another passageway from the gap to the basin for the flow of excess metal from the gap into the basin.

2. A device according to claim 1 which comprises refractory mold parts formed of mating halves of rigid refractory material and preheating exothermic material as an integral structure.

3. A device according to claim 1 which comprises shell-molded refractory parts, and the preheating exothermic material is integral with the refractory parts.

4. A device according to claim 1 which comprises two mating refractory mold parts and secured bodies of shell-molded preheating exothermic material.

5. A device according to claim 1 which comprises a device formed of two refractory mold parts having connecting flanges at their mating surfaces, and removable C-shaped spring clamps to engage the flanges and hold the two halves together.

References Cited in the file of this patent

UNITED STATES PATENTS

| | | |
|---|---|---|
| 1,239,586 | Gebhard | Sept. 11, 1917 |
| 1,793,047 | Brewitt | Feb. 17, 1931 |
| 2,490,327 | Soffel | Dec. 6, 1949 |
| 2,500,097 | Soffel | Mar. 7, 1950 |
| 2,569,956 | Schiltknecht | Oct. 2, 1951 |
| 2,736,936 | Grueneberg et al. | Mar. 6, 1956 |
| 2,870,499 | Burke | Jan. 27, 1959 |

FOREIGN PATENTS

| | | |
|---|---|---|
| 206,120 | Great Britain | Apr. 3, 1924 |
| 769,719 | Great Britain | Mar. 13, 1957 |